United States Patent [19]

Persons

[11] Patent Number: 4,794,769
[45] Date of Patent: Jan. 3, 1989

[54] BALL HITCH LOCK

[76] Inventor: Thomas H. Persons, 3200 Quarles Rd., Brooklyn Center, Minn. 55429

[21] Appl. No.: 123,202

[22] Filed: Nov. 20, 1987

[51] Int. Cl.$^4$ ............................................. F16B 41/00
[52] U.S. Cl. ................................. 70/232; 70/DIG. 57
[58] Field of Search ................. 70/232, 229, 230, 231, 70/DIG. 57, DIG. 58; 280/507

[56] References Cited

U.S. PATENT DOCUMENTS

| | | | |
|---|---|---|---|
| 1,279,509 | 9/1918 | Burks et al. | 70/232 |
| 2,205,541 | 6/1942 | Swift | 70/232 |
| 3,181,523 | 5/1965 | Casey | 70/232 |

FOREIGN PATENT DOCUMENTS 440342  10/1948  Italy ..................................... 70/232

*Primary Examiner*—Robert L. Wolfe
*Attorney, Agent, or Firm*—Douglas L. Tschida

[57] ABSTRACT

Apparatus for lockably securing the threaded ball of a ball-type trailer hitch to the hitch tongue. A first laminated washer-like assembly, including a locking hasp and recess, is boltably secured with the ball to the hitch tongue. A cap member, including a mating hasp portion, mounts into the washer recess to receive a padlock and protect the otherwise unprotected end of the ball fastener.

4 Claims, 1 Drawing Sheet

U.S. Patent
Jan. 3, 1989
4,794,769
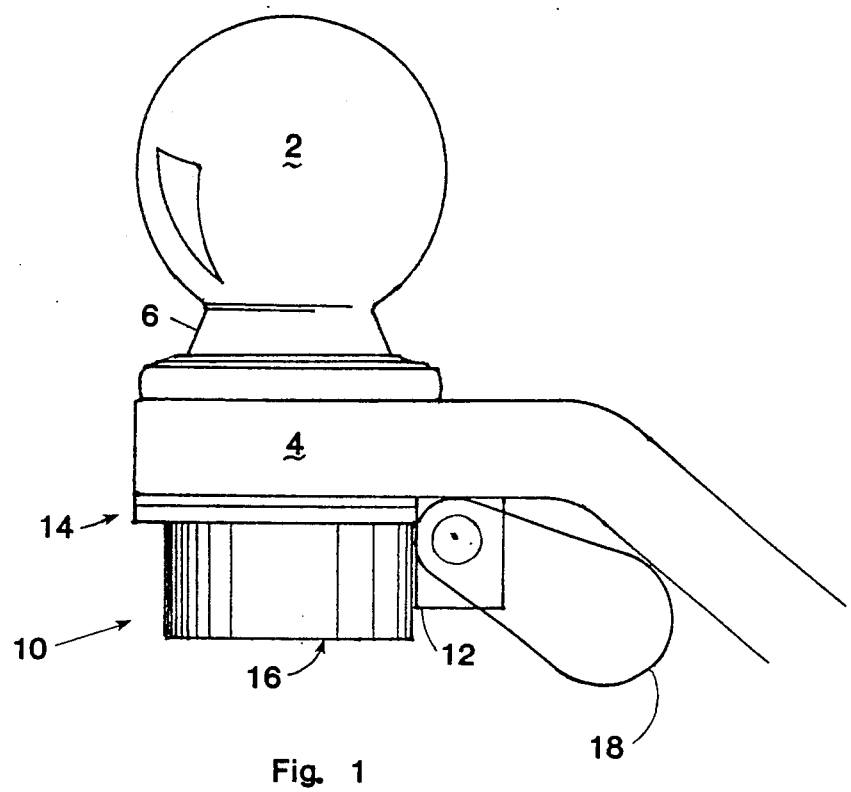
Fig. 1
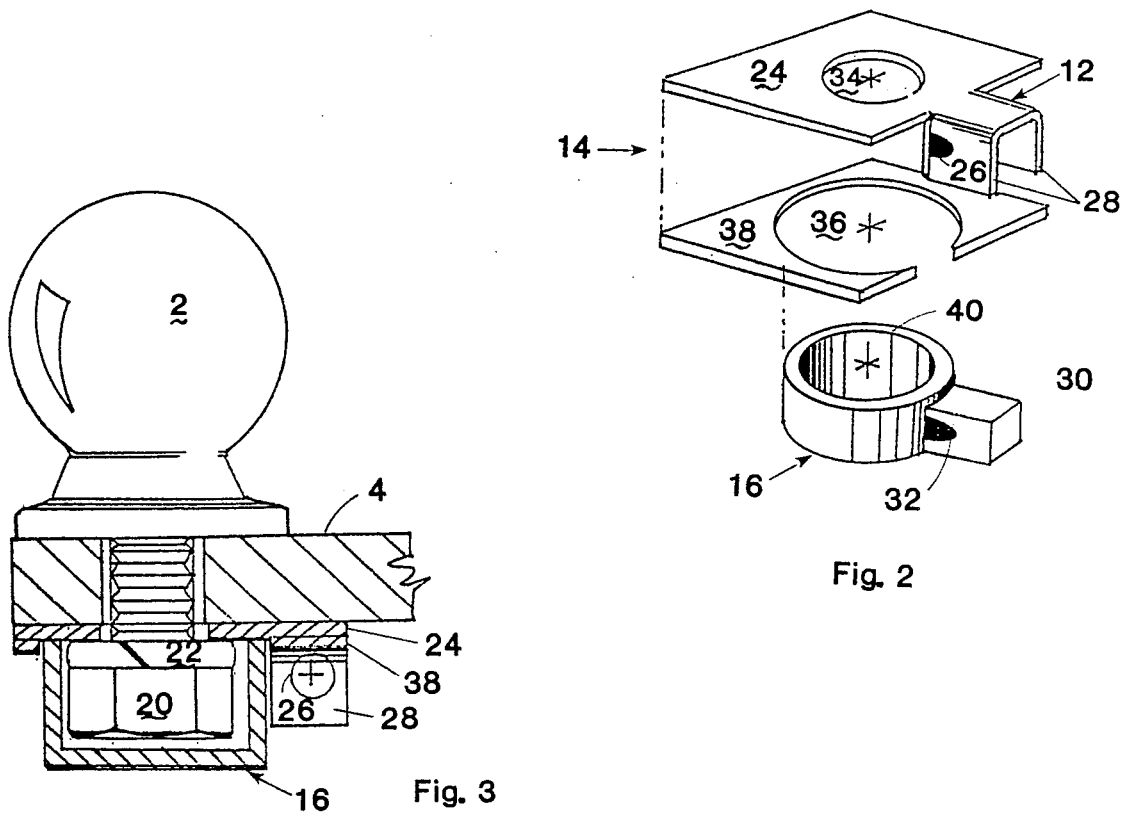
Fig. 2
Fig. 3

BALL HITCH LOCK

BACKGROUND OF THE INVENTION

The present invention relates to locking apparatus for ball-type trailer hitches and, in particular, to a locking assembly for preventing the unauthorized detachment of the ball and/or mounted trailer from the hitch tongue.

Over the years, a number of locking devices have been developed for boat and utility trailers for separately locking the trailer to the vehicle and for protecting the hitch's ball-receiving socket, when the trailer is detached, to prevent against unauthorized tow-away.

Of the latter types of devices, which appear to be the most common, Applicant is aware of a number of assemblies which may be found upon directing attention to U.S. Pat. Nos. 3,780,546; 4,291,557; 4,542,914; and 4,459,832. Each of these assemblies are of a pseudo-ball construction and mount in locked relation to the trailer coupler's ball socket to prevent access thereto when the trailer is detached.

Of the former devices, a padlock is most commonly mounted through the holes of a spring-loaded lever assembly at the trailer coupler to prevent the release of an associated, wedging yoke which is drawn against-/released from the ball upon operating the lever. Upon restraining the lever in its closed position, with the trailer attached to the tow vehicle, the wedging yoke is protected on its underside by the trailer tongue. The padlock, in turn, protects the topside of the coupled assembly.

In this regard, Applicant is also aware of U.S. Pat. No. 3,522,958, which although not disclosing a ball locking assembly, discloses an arrangement for securing the trailer tongue socket to the ball without the necessity of safety chains. It is to be appreciated however that even though the padlocked latch assembly may discourage most would-be thieves, the trailer is still susceptible of theft. That is, the thief need merely unscrew the bolt or nut securing the captured ball to the hitch tongue and reattach the ball to the thief's vehicle. A need, therefore, exists for a lock assembly to separately protect the hitch ball, which may be employed in combination with the trailer coupler lock to prevent the detachment of the entire assembly from the hitch tongue.

Relative to this problem, Applicant is aware of U.S. Pat. No. 4,230,336 which discloses a cam-acting, threaded locking member that mounts within the ball-securing bolt and includes an open-ended guard collar which surrounds the head of the bolt. In combination, the assembly prevents detachment of the hitch ball from the tongue, although requires a specially formed connecting bolt. A need, therefore, still exists for a less-complex, more economically produceable, assembly which readily mounts to and locks the ball to the hitch tongue.

SUMMARY OF THE INVENTION

It is accordingly a primary object of the present invention to provide a locking assembly for preventing the unauthorized removal of a trailer hitch ball from a hitch tongue.

It is a further object of the invention to provide a locking assembly which readily mounts to all of the various types of available hitch ball constructions.

It is yet another object of the invention to provide an assembly which does not require modification of the hitch tongue.

The foregoing objects and advantages are particularly achieved in the presently preferred embodiment which comprises a washer-like member which mounts to the hitch tongue beneath the ball-securing lock washer and nut/bolt. An apertured hasp portion extends from the washer member to one side of the nut/bolt head, and a concentric recess is provided in the washer member to receive the nut/bolt head.

A cap member including a mating channeled hasp portion mounts to the washer portion with the upper open edge of the cap protected within the recess and the hasp channel aligning with the apertures of the mating hasp. A padlock inserted through the hasp secures the cap in covering relation to the nut/bolt head.

The foregoing objects, advantages and distinctions of the invention as well as others will, however, become more apparent upon reference to the following description of the presently preferred embodiment with respect to the appended drawings. Before referring thereto, it is to be appreciated the following description is made by way of the presently preferred embodiment only and that various modifications, some of which are described, might be made thereto without departing from the spirit and scope of the invention. It accordingly should not be interpreted in limitation of the scope of the invention.

BRIEF DESCRIPTION OF THE DRAWINGS

FIG. 1 shows a front elevation view of the invention in mounted relation to a conventional trailer ball-type hitch.

FIG. 2 shows an exploded perspective view of the components of the invention.

FIG. 3 shows a partial cross-sectioned elevation view in its mounted relation to the ball hitch.

DESCRIPTION OF THE PREFERRED EMBODIMENT

Referring to FIG. 1, a front elevation view is shown of a typical trailer hitch ball 2, such as it appears when mounted to a trailer hitch tongue 4. Depending upon the size of the mating coupler, most hitch balls 2 are 1⅞ or 2 inches in diameter. In use, the ball mounts within a formed socket of a mating coupler mounted to the tongue of the trailer (not shown). The trailer coupler, in turn, typically includes a lever-actuated wedging member which mounts in the area of a bottom-most tapered rim 6 of the ball. Upon operating the lever handle, the wedging member is drawn into contact with the ball to provide a secure engagement therebetween.

Depending upon the construction of the ball itself, a cooperatively mounted threaded nut/bolt fastener is used to secure the ball 2 to the tongue 4. In either case, though, the hexagon nut or bolt head is normally exposed beneath the tongue 4, even though the ball 2 is covered by the trailer tongue coupler. Thus, a thief need merely unscrew the bolt or nut to release the trailer from the towing vehicle, set the detached ball over another tongue and re-secure the ball and attached trailer to the other vehicle's trailer hitch. As shown in FIG. 1, however, the present ball locking assembly 10 covers the nut or bolt to prevent against the detachment of the ball 2.

In particular, the assembly 10 is comprised of a laminated hasp 12 containing washer member 14 and a mating cap member 16 which is secured to the hasp 12 via a keyed padlock 18. In contrast to the locking assembly of U.S. Pat. No. 4,230,336, the present arrangement does not require a specially constructed ball or locking bolt and completely encloses the nut/bolt head to prevent access thereto with a cold chisel, pry bar, saw or the like.

Turning attention next to FIG. 2, an exploded assembly view is shown of the various piece parts of the assembly 10. FIG. 3, in turn, shows a cross-section view of the ball lock 10 relative to the hitch bolt 20 and lock washer 22 commonly used to secure the ball to the trailer tongue. From FIG. 2, it is to be noted that the laminated washer member 14 is comprised of two generally rectangular flat stock members constructed of ⅛ inch thick steel plate which are approximately 2½ by 2½ inches square and which are welded to one another to form a laminated construction. The uppermost member 24 is formed to include the hasp portion 12 which projects from one side. An aperture 26 is formed through each of the vertical side, channelway forming tangs 28 of the hasp 12 and whereat the stem of the padlock is received. A mating hasp portion 30 including an aperture 32 extending from the side of the cap member 16 mounts within the hasp 12 with its channel 32 aligned with the apertures 26. The stem of the padlock 18 is insertable therethrough and secures the cap member 16 in covering relation to the nut/bolt head.

Relative to the mounting of the cap member 16 to the washer member 14, it is to be noted the hole 34 in the plate member 24 is sized to be only slightly larger than the threaded stem of the bolt 20, whereas the hole 36 in the plate member 38 is sized to be slightly larger than the outer diameter of the cap member 16. Consequently, the uppermost flat edge 40 of the cap member 16 mounts in protected abutting relation to the plate member 24 in the recess provided by the aperture 36. The insertion of a prying apparatus therebetween is thus prevented.

Turning attention to FIG. 3, the particular details of the mounting relation of the cap member 16 to the mounted washer member 14 are shown. From this view, it is to be appreciated the hasp portion 30 has been deleted for purposes of drawing clarity, but would normally mount in alignment with the hasp side wall 28 and aperture 26. Otherwise, it is to be appreciated the cap member 16 is of a solid construction and thus the nut/bolt head 20 and lock washer 22 are completely encased by the locking assembly 10. Also more apparent from this view is the recessed mounting of the cap member 16 within the recess provided by the hole 36.

Although the invention has been described with respect to its presently preferred embodiment, it is to be appreciated modifications may be made thereto without departing from the spirit and scope of the invention. For example, in lieu of a laminated washer member 14, a cast member might be employed or, alternatively, still other laminations 38 might be included to increase the recess depth and/or some other geometric configuration, such as a circular construction, might be equally employed. Similarly, the configuration of the mating hasp portions 12 and 13 might be varied or the washer member 14 may include a cylindrical projection which interlocks with the cap in lieu of a recess. Also, it is to be appreciated such a lock assembly might be used with any trailer coupler having an exposed threaded member. Accordingly, the following claims should be interpreted to include all those equivalent embodiments within the spirit and scope thereof.

What is claimed is:

1. Locking apparatus comprising:
   (a) a washer member having a bore, a recess surrounding said bore and an apertured tang portion, mounting about a threaded fastener member;
   (b) a cap member having an open end mounting in said recess and including a mating apertured tang portion mounting to said washer member hasp and wherein one of said tank portions forms a channelway for receiving the other tang portion; and
   (c) means insertable through said tang portions when mounted to one another for securing said cap member in protective covering relation to said threaded fastener member.

2. Apparatus as set forth in claim 1 wherein said securing means comprises a padlock.

3. Apparatus for lockably securing a trailer hitch ball to a hitch tongue comprising:
   (a) at least first and second flat laminated plate members, said first plate member having a mounting aperture through which a ball securing threaded fastener is insertable and a pair of apertured parallel aligned transverse tangs along one edge and said second plate member having a larger diameter aperture;
   (b) a cylindrical cap member having one open end mountable in abutment with said first plate member in the aperture of said second plate member and including an apertured tang member extending from one side, wherein the tang aperture of said first plate and cap members mount in adjacent aligned relation; and
   (c) lock means insertable through the tang apertures to restrain said cap member in covering relation to the exposed end of said threaded fastener.

4. Locking apparatus comprising:
   (a) a plurality of laminated plates, wherein a side edge of at least one of said plates includes a pair of apertured parallel aligned transverse tangs, wherein at least one other of said plates includes a recess forming aperture when stacked with others of said plates and in which recess the exposed end of a threaded fastener member mounts;
   (b) a cap member having an open end mounting in said recess and including a mating apertured tang portion mounting to said washer member tangs; and
   (c) means insertable through said tangs when mounted to one another for securing said cap member in protective covering relation to said threaded fastener member.

* * * * *